United States Patent
Hosoda et al.

[11] Patent Number: 5,951,046
[45] Date of Patent: Sep. 14, 1999

[54] CONSTRUCTION FOR ATTACHING A SEAT BELT ADJUSTER

[75] Inventors: Hirotsugu Hosoda; Toshiyuki Konishi; Masahiro Suzuki, all of Hamamatsu, Japan

[73] Assignee: Suzuki Motor Corporation, Hamamatsu, Japan

[21] Appl. No.: 09/013,844

[22] Filed: Jan. 27, 1998

[30] Foreign Application Priority Data

Jan. 31, 1997 [JP] Japan .................................. 9-018454

[51] Int. Cl.⁶ .................................................. B60R 22/20
[52] U.S. Cl. ................................. 280/801.2; 280/801.1; 280/808
[58] Field of Search ............................. 280/801.2, 801.1, 280/808; 297/468, 483

[56] References Cited

U.S. PATENT DOCUMENTS 4,909,541 3/1990 Tokugawa ............................ 280/808
5,547,222 8/1996 Schmidt ............................. 280/801.2

FOREIGN PATENT DOCUMENTS 63-48734 4/1984 Japan .
2247608 3/1992 United Kingdom ............... 280/801.2

*Primary Examiner*—Eric Culbreth
*Attorney, Agent, or Firm*—Alston & Bird LLP

[57] ABSTRACT

There is provided a construction for attaching an adjuster in which even if adjuster body attaching bolts are not sub-assembled, an adjuster body can be fixed temporarily to a pillar without the contact of a lock pin, which is provided at the tip end of an operating knob, with the pillar. The construction is such that a crank-shaped locking portion is provided at the intermediate portion of the adjuster body.

8 Claims, 8 Drawing Sheets

CONSTRUCTION FOR ATTACHING A SEAT BELT ADJUSTER

BACKGROUND OF THE INVENTION

1. Field of the Invention

The present invention relates to a construction for attaching a seat belt adjuster used when a vehicular seat belt is attached to a pillar.

2. Description of Related Art

A seat belt adjuster used for a vehicle is generally attached to a vehicle body pillar as shown in FIGS. 21 and 22 and as disclosed in Japanese Patent Publication No. 63-48734 etc.

A square cross section claw 28, which is inserted into a square hole 31 formed in a pillar 27, is provided on a seat belt adjuster 26 as shown in FIGS. 21 to 24 to prevent the seat belt adjuster 26 from rotating while it is installed. The length of the claw 28 is L1, which is longer than the underhead length L2 of an attaching bolt 30 for an adjuster body 29, so that the claw 28 is inserted into the hole 31 earlier than the bolts 30 when the adjuster 26 is installed. Therefore, since the adjuster 26 has been fixed by the claw 28 when the bolts 30 are tightened, the adjuster 26 can be fastened to the pillar 27 easily.

However, in the above-mentioned fastening method, it is indispensable to sub-assemble the attaching bolts 30 to the adjuster body 29 in advance. Specifically, as shown in FIGS. 24 and 25, it is necessary to install a spacer 34 and a setting washer 35 from the tip end of the bolts 30 after the bolts 30 is assembled to the adjuster body 29. If the aforementioned fastening method is used without the bolts 30 being sub-assembled and without the spacers 34 being used, a lock pin 33 provided at the tip end of an operating knob comes into contact with the pillar 27, producing an adverse effect on the engagement of the lock pin 33 with the adjuster body 29.

SUMMARY OF THE INVENTION

An object of the present invention is to provide a construction for attaching an adjuster in which even if adjuster body attaching bolts are not sub-assembled, an adjuster body can be fixed temporarily to a pillar without the contact of a lock pin, which is provided at the tip end of an operating knob, with the pillar.

The present invention provides a construction in which a locking portion for locking the adjuster body to the pillar is provided at the intermediate portion of the adjuster body.

Also according to the present invention, if the construction is such that steps are provided between the end portions and the intermediate portion of the adjuster body or a locking portion is provided at least at either of upper and lower end portions of the adjuster body, the object of the present invention can be achieved more effectively.

DETAILED DESCRIPTION OF THE PREFERRED EMBODIMENTS

Figure 1:
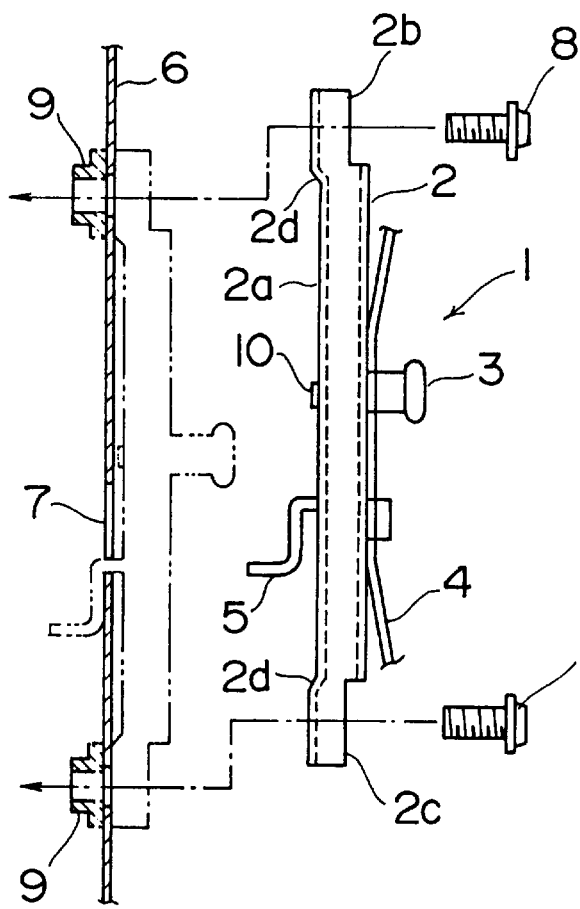
FIG. 1 is an adjuster assembling view showing a state in which an adjuster is assembled to a pillar by using the present invention.

An adjuster 1 for adjusting the belt anchor position of a seat belt system (not shown) of a vehicle includes an adjuster body 2 provided with an adjuster rail portion and the like, an operating knob 3, and a cover 4.

The adjuster body 2 is provided with a locking portion at an intermediate portion 2a of the body 2 and holes for an attaching bolt 8 for the body 2 at both end portions 2b and 2c (2b denotes the upper end, and 2c denotes the lower end), and steps 2d are provided between the intermediate portion 2a and the end portions 2b and 2c.

Figure 3:
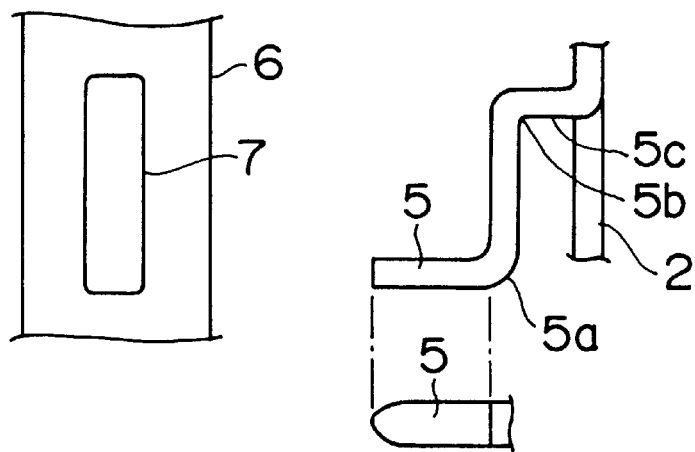
FIG. 3 is a combination of an enlarged view of a locking portion provided at the intermediate portion of adjuster body and an enlarged front view of the corresponding pillar portion, in accordance with an embodiment of the present invention.
Figure 4:
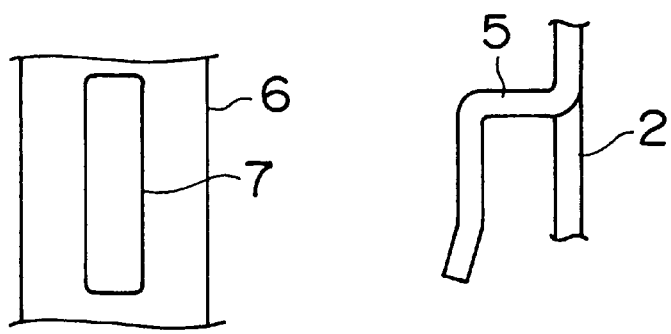
FIG. 4 is a combination of an enlarged view of a locking portion provided at the intermediate portion of adjuster body and an enlarged front view of the corresponding pillar portion, in accordance with another embodiment of the present invention.
Figure 5:
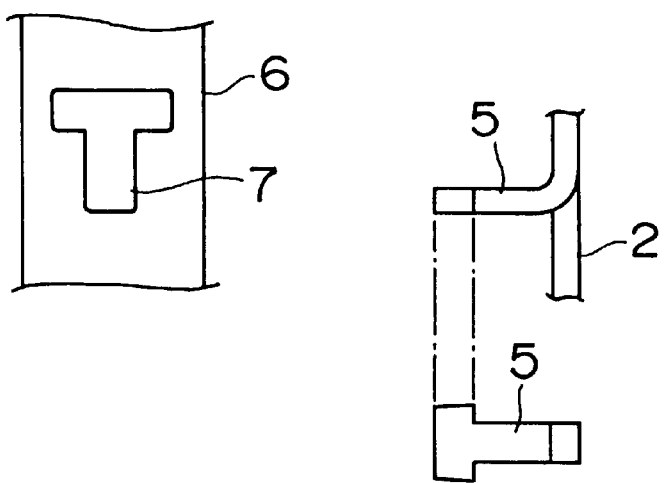
FIG. 5 is a combination of an enlarged view of a locking portion provided at the intermediate portion of adjuster body and an enlarged front view of the corresponding pillar portion, in accordance with still another embodiment of the present invention.

A procedure for fixing the adjuster 1 to a pillar 6 of a vehicle is as follows: First, the locking portion 5 of the adjuster body 2 is locked to a hole 7 formed in the pillar 6. The shapes of the locking portion 5 and the corresponding hole 7 are as shown in FIGS. 3 to 5. In FIG. 3, the locking portion 5 is shaped like a crank in cross section, and the tip end thereof is rounded thin. The corresponding hole 7 in the pillar 6 is a vertically elongated hole. In FIG. 4, the locking portion 5 is L-shaped in cross section, and the tip end thereof is bent to the outside. The corresponding hole 7 has the same shape as that shown in FIG. 3. In FIG. 5, the locking portion 5 is bent to the outside from the body 2 and the tip end thereof is T-shaped. The corresponding hole 7 also has a T-shaped.

Referring to FIG. 1, a state in which the adjuster body 2 is fixed to the pillar 6 by using the attaching bolts 8 and nuts 9 welded to the pillar 6 is indicated by an imaginary line. No matter what position the operating knob 3 is located, and whether or not the attaching bolts 8 are sub-assembled to the body 2, a lock pin 10 provided at the tip end of the knob 3 does not come into contact with the pillar 6.

As for the shape of the locking portion 5 shown in FIG. 3, if the radius of a bent portion 5a is increased, the radius of a bent portion 5b is minimized, and a face 5c is made a plane, the locking portion 5 can be locked easily to the hole 7, and also the attaching bolts 8 and the nuts 9 can be tightened easily.

In addition to the locking portion 5 provided on the adjuster body 2, if a locking portion is provided at the upper end 2b or the lower end 2c of the adjuster body 2 and a hole or a recess is provided at the corresponding portion of the pillar 6 as shown in FIGS. 6 to 14, the installation of the adjuster can be made further easier.

Figure 6:
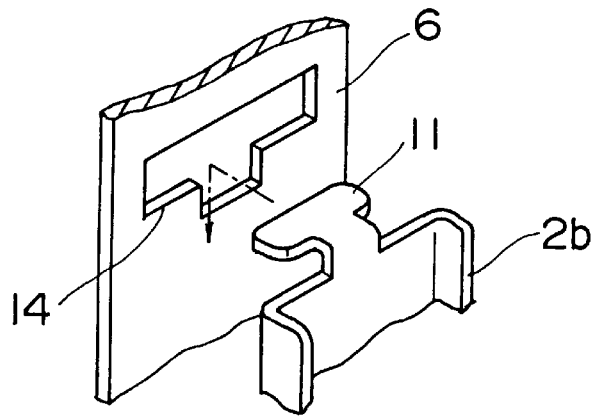
FIG. 6 is an assembling view of a locking portion at the upper end of adjuster body and a pillar, in accordance with an embodiment of the present invention.
Figure 7:
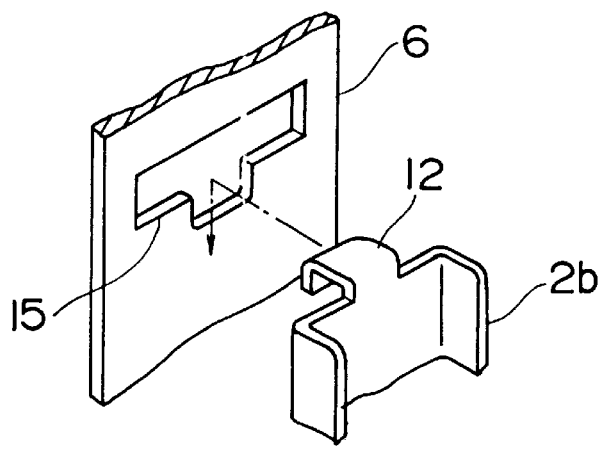
FIG. 7 is an assembling view of a locking portion at the upper end of adjuster body and a pillar, in accordance with another embodiment of the present invention.
Figure 8:
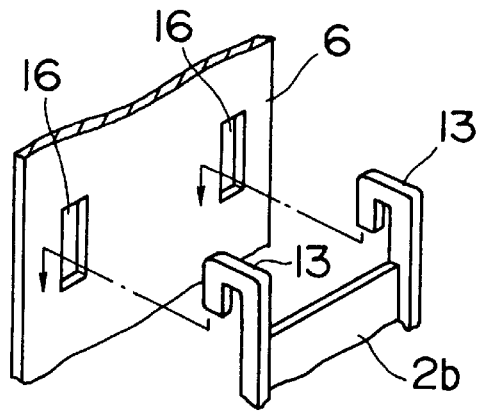
FIG. 8 is an assembling view of a locking portion at the upper end of adjuster body and a pillar, in accordance with still another embodiment of the present invention.
Figure 9:
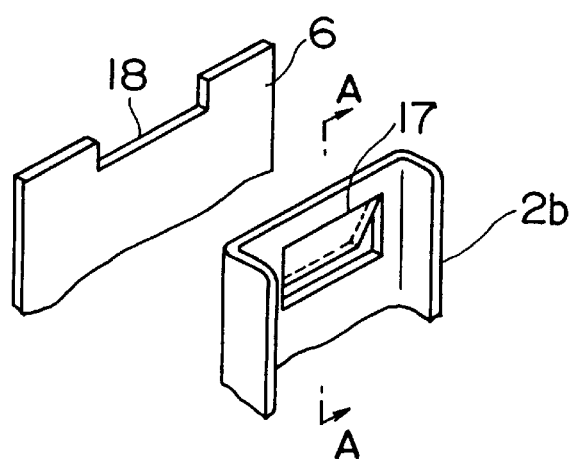
FIG. 9 is an assembling view of a locking portion at the upper end of adjuster body and a pillar, in accordance with still another embodiment of the present invention.
Figure 10:
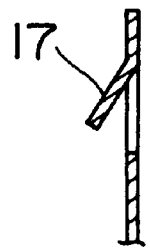
FIG. 10 is a sectional view taken along the line A—A of FIG. 9.
Figure 11:
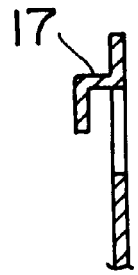
FIG. 11 is a sectional view showing a modification of FIG. 10.

Specifically, FIGS. 6 to 11 show examples in which the locking portion is provided at the upper end 2b. Among these figures, FIGS. 6 to 8 show examples in which a locking portion 11, 12, 13 is provided at the upper end 2b and a hole 14, 15, 16 is formed at the corresponding portion of the pillar 6. FIG. 9 shows an example in which a locking portion 17 is provided at the upper end 2b and a concave portion 18 is provided in the pillar 6. FIG. 10 is a sectional view taken along the line A—A of FIG. 9, and FIG. 11 shows a modification of FIG. 10.

Figure 12:
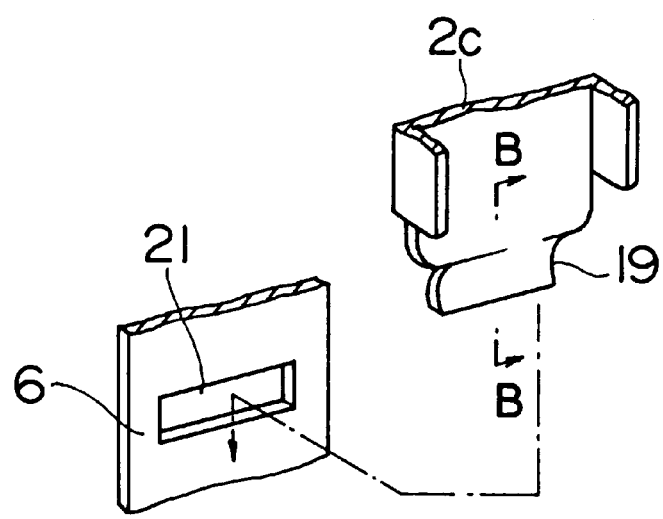
FIG. 12 is an assembling view of a locking portion at the lower end of adjuster body and a pillar, in accordance with an embodiment of the present invention.
Figure 13:
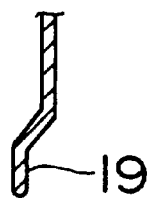
FIG. 13 is a sectional view taken along the line B—B of FIG. 12.
Figure 14:
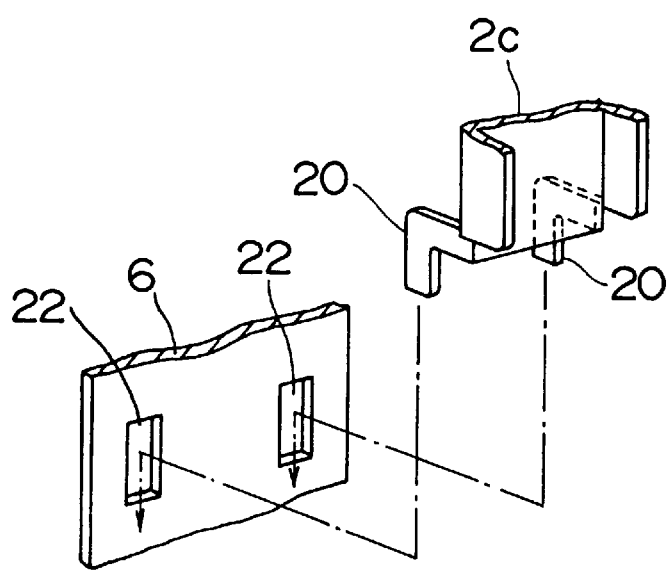
FIG. 14 is an assembling view of a locking portion at the lower end of adjuster body and a pillar, in accordance with another embodiment of the present invention.

FIGS. 12 and 14 show examples in which the locking portion is provided at the lower end 2c. A locking portion 19, 20 is provided at the lower end 2c and a hole 21, 22 is formed at the corresponding portion of the pillar 6. FIG. 13 is a sectional view taken along the line B—B of FIG. 12.

Although the locking constructions at the upper and lower ends have been described above, a sufficient effect can be achieved if the aforementioned construction is provided at least at either end.

Further, if the locking portion 5 is provided on the adjuster body 2 and a construction shown in FIGS. 15 to 20 is added, the same effect as that of the examples shown in FIGS. 6 to 14 can be achieved.

Figure 16:
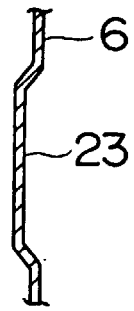
FIG. 16 is a sectional view taken along the line C—C of FIG. 15.
Figure 17:
FIG. 17 is a sectional view taken along the line D—D of FIG. 15.
Figure 15:
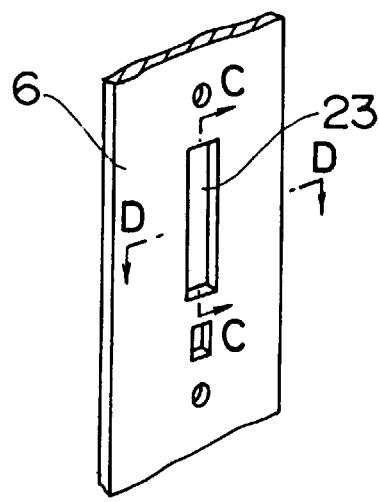
FIG. 15 is a perspective view showing an embodiment of the present invention in which the construction of a pillar is changed.
Figure 18:
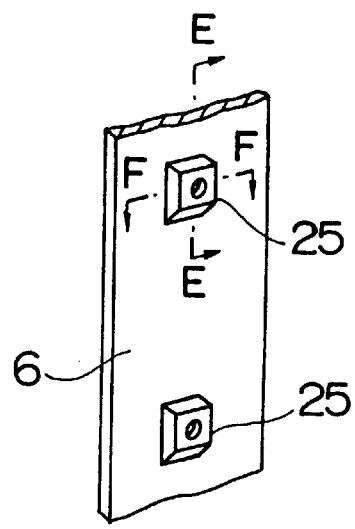
FIG. 18 is a perspective view showing another embodiment of the present invention in which the construction of a pillar is changed.
Figure 19:
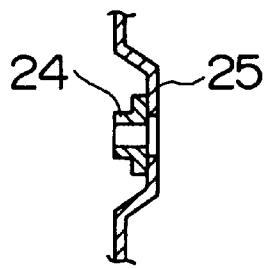
FIG. 19 is a sectional view taken along the line E—E of FIG. 18.
Figure 20:
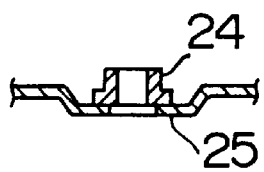
FIG. 20 is a sectional view taken along the line F—F of FIG. 18.
Figure 21:
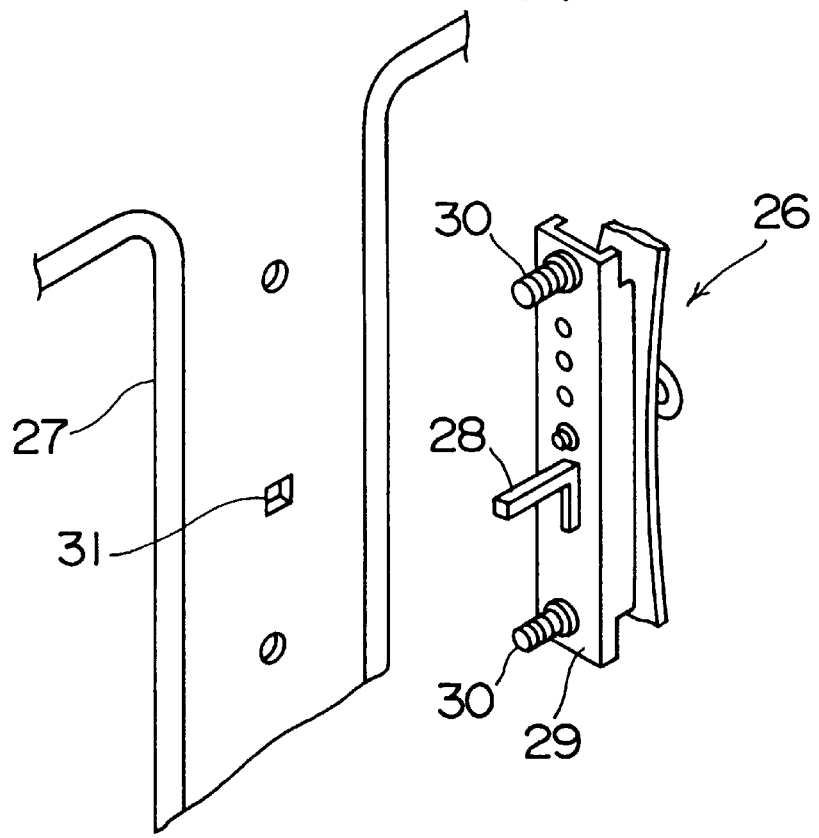
FIG. 21 is an assembling view of a conventional adjuster and a pillar.
Figure 22:
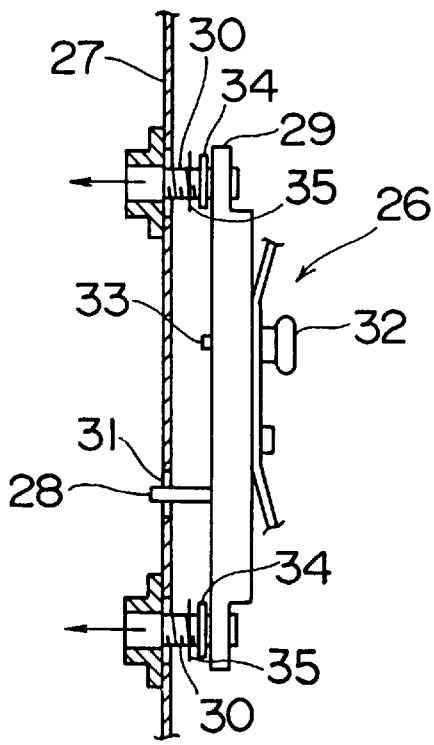
FIG. 22 is an assembling side view of a conventional adjuster and a pillar.
Figure 24:
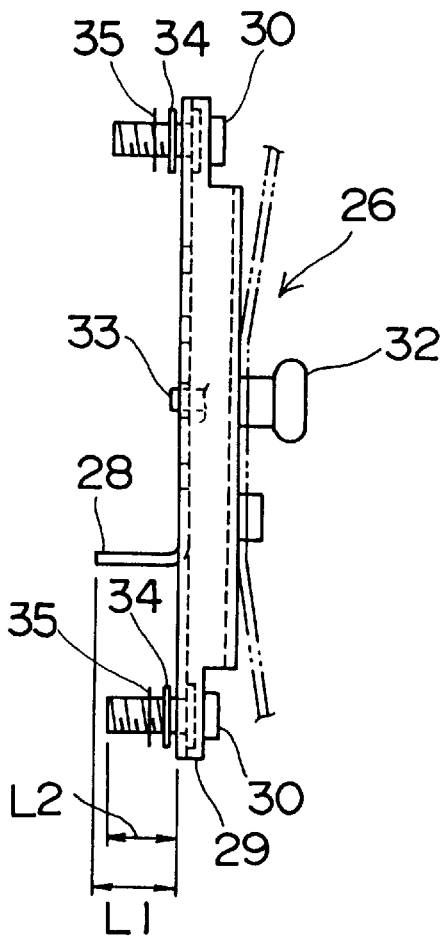
FIG. 24 is a side view showing a case where attaching bolts are sub-assembled to a conventional adjuster.
Figure 23:
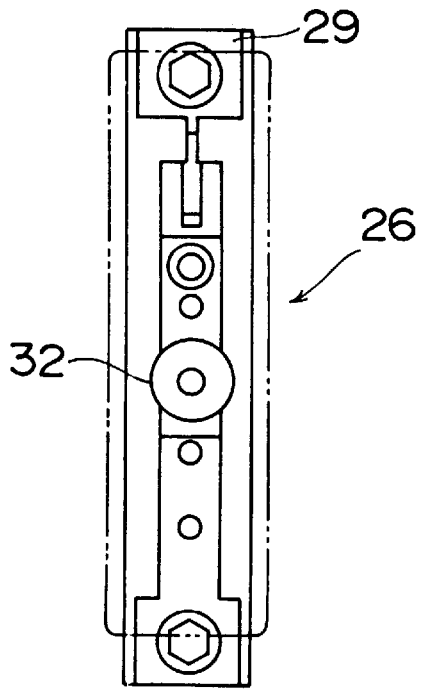
FIG. 23 is a plan view of a conventional adjuster.
Figure 25:
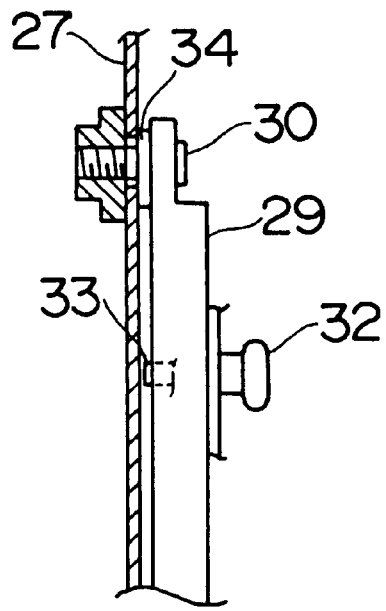
FIG. 25 is a partial side view at the time when the adjuster shown in FIG. 24 is attached to a pillar.
Figure 26:
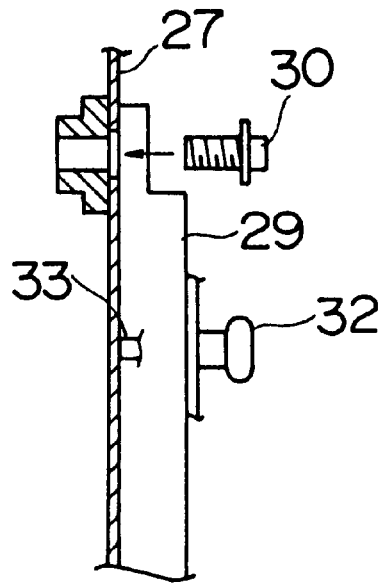
FIG. 26 is a partial side view at the time when the adjuster is attached to a pillar in a case where attaching bolts are not sub-assembled.

Specifically, steps are not provided on the adjuster body 2, and the construction of the pillar 6 is changed to prevent the contact with the lock pin 10. FIG. 15 shows an example in which a vertically elongated recess 23 is provided in the pillar 6. FIGS. 16 and 17 are sectional views taken along the lines C—C and D—D of FIG. 15, respectively. FIG. 18 shows an example in which only the seat faces of the nuts 24 welded to the pillar 6 are inversely protruded toward the adjuster body to form convex portions 25. FIGS. 19 and 20 are sectional views taken along the lines E—E and F—F of FIG. 18, respectively.

As is apparent from the above description, the present invention can accommodate both cases where the attaching bolts are sub-assembled and where they are not without changing the rotation preventive construction, so that the number of parts and the assembling man-hour can be reduced.

Also, since the steps are provided on the adjuster body between the intermediate portion where the lock pin is located and both end portions which constitute attaching faces, the lock pin can be prevented from being in contact with the pillar surface.

Also, since the recess is provided at the portion of the pillar corresponding to the intermediate portion of the adjuster body or since the convex portions are provided at both end portions of the adjuster body, the lock pin can be prevented from being in contact with the pillar surface.

Further, in the case where the attaching bolts are not sub-assembled, if the locking portions are provided at both end portions of the adjuster body so as to be locked to the pillar, accurate attachment of the adjuster to the pillar can be made further easier.

What is claimed is:

1. A seat belt adjuster assembly comprising:
    an attachment pillar having a hole extending therethrough; and
    a seat belt adjuster including an adjuster body having a crank-shaped locking portion disposed at an intermediate portion of the adjuster body, the crank-shaped locking portion engaging the hole in the attachment pillar to prevent rotation of the adjuster body with respect to the attachment pillar during installation of the seat belt adjuster to the attachment pillar.

2. The seat belt adjuster of claim 1 wherein the adjuster body includes upper and lower end portions and steps between the intermediate portion of the adjuster body and the upper and lower end portions thereof for spacing the intermediate portion away from the attachment pillar.

3. The seat belt adjuster of claim 2 wherein the adjuster body includes an additional locking portion on at least one of the upper and lower end portions thereof, and the attachment pillar includes a corresponding hole for receiving the additional locking portion.

4. A seat belt adjuster assembly comprising:
    an attachment pillar having a hole extending therethrough; and
    a seat belt adjuster including an adjuster body having upper and lower end portions and an L-shaped locking portion disposed at an intermediate portion of the adjuster body, the L-shaped locking portion having a tip end thereof that is bent to the outside and engaging the hole in the attachment pillar to prevent rotation of the adjuster body with respect to the attachment pillar during installation of the seat belt adjuster to the attachment pillar and wherein the adjuster body includes an additional locking portion on at least one of the upper and lower end portions thereof, and the attachment pillar includes a corresponding hole for receiving the additional locking portion.

5. The seat belt adjuster of claim 4 wherein the adjuster body includes steps between the intermediate portion of the adjuster body and the opposite end portions thereof for spacing the intermediate portion away from the attachment pillar.

6. A seat belt adjuster assembly comprising:

an attachment pillar having a hole extending therethrough; and a seat belt adjuster including an adjuster body having a locking portion disposed at an intermediate portion of the adjuster body, the locking portion having a T-shaped bent portion at a tip end thereof, the locking portion engaging the hole in the attachment pillar to prevent rotation of the adjuster body with respect to the attachment pillar during installation of the seat belt adjuster to the attachment pillar.

7. The seat belt adjuster of claim 6 wherein the adjuster body includes upper and lower end portions and steps between the intermediate portion of the adjuster body and the upper and lower end portions thereof for spacing the intermediate portion away from the attachment pillar.

8. The seat belt adjuster of claim 7 wherein the adjuster body includes an additional locking portion on at least one of the upper and lower end portions thereof, and the attachment pillar includes a corresponding hole for receiving the additional locking portion.

* * * * *

UNITED STATES PATENT AND TRADEMARK OFFICE
CERTIFICATE OF CORRECTION

PATENT NO. : 5,951,046
DATED : September 14, 1999
INVENTOR(S) : Hosoda et al.

Page 1 of 2

Figure 2:
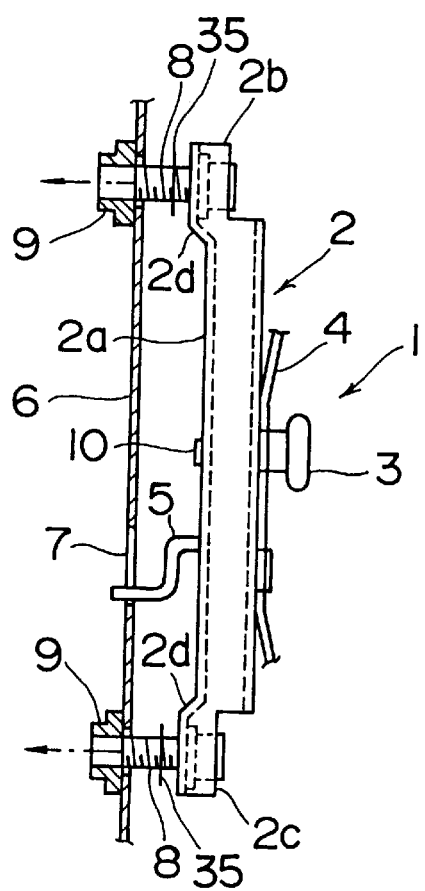
FIG. 2 is an adjuster assembling view in the case where attaching bolts are sub-assembled by using the present invention.

It is certified that error appears in the above-identified patent and that said Letters Patent is hereby corrected as shown below:

In the drawings, sheet 1 of 8, Fig. 2 should be replaced with the following figure:

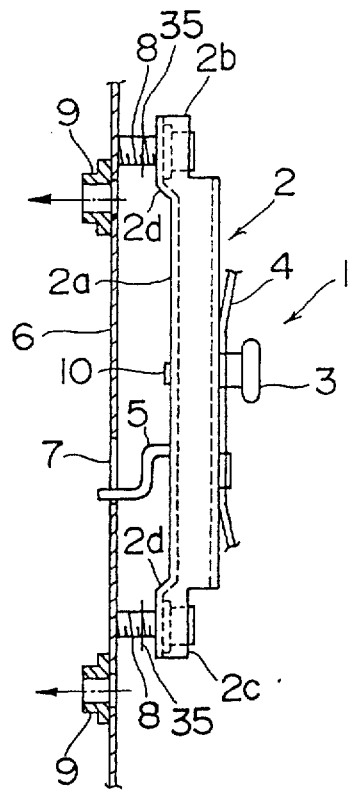

UNITED STATES PATENT AND TRADEMARK OFFICE
CERTIFICATE OF CORRECTION

PATENT NO. : 5,951,046
DATED : September 14, 1999
INVENTOR(S) : Hosoda et al.

It is certified that error appears in the above-identified patent and that said Letters Patent is hereby corrected as shown below:

Title page, References Cited [56], FOREIGN PATENT DOCUMENTS, line 1, "4/1984" should read --9/1988--.

Column 4, line 59, "to the outside" should read --away from the adjuster body--.

Column 5, line 3, "opposite" should read --upper and lower--.

Signed and Sealed this

Eighteenth Day of July, 2000

Attest:

Q. TODD DICKINSON

*Attesting Officer*     *Director of Patents and Trademarks*